US010638291B2

(12) United States Patent
Wong et al.

(10) Patent No.: US 10,638,291 B2
(45) Date of Patent: Apr. 28, 2020

(54) PRESENTATION APPARATUS (CHECK-IN AND CHECK-OUT)

(71) Applicants: CHOW TAI FOOK JEWELLERY COMPANY LIMITED, Hong Kong (CN); MEGASOFT LIMITED, Shatin, New Territories, Hong Kong (CN)

(72) Inventors: Siu Kee Wong, Hong Kong (CN); Siu Kwong Tsang, Hong Kong (CN); Chun Sing Matthew Man, Shatin (CN)

(73) Assignees: CHOW TAI FOOK JEWELLERY LIMITED, Hong Kong (CN); MEGASOFT LIMITED, Hong Kong (CN)

( * ) Notice: Subject to any disclaimer, the term of this patent is extended or adjusted under 35 U.S.C. 154(b) by 868 days.

(21) Appl. No.: 15/023,916

(22) PCT Filed: Sep. 23, 2014

(86) PCT No.: PCT/IB2014/064753
§ 371 (c)(1),
(2) Date: Mar. 22, 2016

(87) PCT Pub. No.: WO2015/040596
PCT Pub. Date: Mar. 26, 2015

(65) Prior Publication Data
US 2016/0247220 A1 Aug. 25, 2016

(30) Foreign Application Priority Data
Sep. 23, 2013 (HK) .................................... 13110831

(51) Int. Cl.
*G06Q 30/06* (2012.01)
*G07G 3/00* (2006.01)
(Continued)

(52) U.S. Cl.
CPC ................ *H04W 4/80* (2018.02); *G06F 3/14* (2013.01); *G06K 19/0723* (2013.01);
(Continued)

(58) Field of Classification Search
CPC ...... H04W 4/80; H04W 12/08; G06Q 10/087; G06Q 10/0833; G06Q 20/20; G06Q 20/203; G06Q 30/0267
See application file for complete search history.

(56) References Cited

U.S. PATENT DOCUMENTS 8,271,128 B1 * 9/2012 Schultz ............... G06F 19/3462
700/236
2005/0040934 A1 * 2/2005 Shanton .................... A47F 5/11
340/5.92
(Continued)

FOREIGN PATENT DOCUMENTS

CN 101246658 A 8/2008
CN 103165054 A 6/2013
(Continued)

OTHER PUBLICATIONS

Bardaki et al. (2012). Deploying RFID-Enabled Services in the Retail Supply Chain: Lessons Learned toward the Internet of Things. Information Systems Management, 29(3), 233-245. https://doi.org/10.1080/10580530.2012.687317 (Year: 2012).*
(Continued)

*Primary Examiner* — Marissa Thein
*Assistant Examiner* — Lance Y Cai
(74) *Attorney, Agent, or Firm* — Nixon Peabody LLP; Jeffrey L. Costellia

(57) ABSTRACT

An apparatus comprising a main receptacle, a first detector, a second detector and a processor; wherein said main receptacle is to hold articles for customer selection, said first detector is to detect presence of an article on said main
(Continued)

receptacle, said second detector is to detect an article after said article has been removed from said main receptacle; and wherein the processor is to collect identification information of an article upon introduction of said article into the main receptacle during a serving session and to register introduction of said article, and wherein the processor is to check out or de-register said article from said serving session upon detection of presence of said article at said second detector.

21 Claims, 10 Drawing Sheets

(51) Int. Cl.
  *G07G 1/00* (2006.01)
  *H04W 4/80* (2018.01)
  *G06K 19/07* (2006.01)
  *G06F 3/14* (2006.01)

(52) U.S. Cl.
  CPC ......... *G06Q 30/06* (2013.01); *G06Q 30/0641* (2013.01); *G07G 1/0018* (2013.01); *G07G 3/003* (2013.01)

(56) References Cited

U.S. PATENT DOCUMENTS

| | | | |
|---|---|---|---|
| 2007/0215700 A1 | 9/2007 | Reznik et al. | |
| 2008/0211671 A1* | 9/2008 | Daily | G06Q 20/18 340/572.1 |
| 2008/0238009 A1* | 10/2008 | Carpenter | B62B 3/1408 280/33.992 |
| 2013/0049967 A1* | 2/2013 | Lee | G06Q 10/087 340/585 |
| 2013/0135105 A1* | 5/2013 | Man | G06Q 10/00 340/572.1 |
| 2014/0015642 A1* | 1/2014 | White | G06K 7/10168 340/10.1 |
| 2014/0019241 A1* | 1/2014 | Treiser | G06Q 30/0609 705/14.53 |
| 2015/0115029 A1* | 4/2015 | Rahim | G07F 9/026 235/385 |

FOREIGN PATENT DOCUMENTS

| | | | |
|---|---|---|---|
| GB | 2469343 | A | 10/2010 |
| GB | 2475755 | A | 6/2011 |
| JP | H11-065453 | A | 3/1999 |
| JP | 2002-114335 | A | 4/2002 |
| JP | 2008146476 | A | 6/2008 |
| JP | 2010257023 | A | 11/2010 |
| TW | 200820086 | A | 5/2008 |
| TW | 201328951 | A | 7/2013 |
| WO | WO2008086531 | A1 | 7/2008 |

OTHER PUBLICATIONS

Taiwan Office Action (Application No. 103132934) dated Mar. 29, 2016.
International Search Report for PCT/IB2014/064753 dated Mar. 4, 2015.
European Search Report for EP14845886.2 dated Jul. 6, 2016.
Anthony S.K. Wong et al: "HK RDIF Awards 2010", Nov. 5, 2010, Retrieved from the Internet: URL: https://www.gslhk.org/sites/default/files/media_plus/event-and-news/publications/casebooks/RFIDAwardCaseBook_2010.pdf.
Anonymous: "GS1 EPCglobal RFID-based Electronic Articles Surveillance (EAS) Technical Implementation Guide 3", Sep. 1, 2009, Retrieved from the Internet: URL: http://www.gs1.org/sites/default/files/docs/epc/EAS_Tech_ImplementationGuide_v_1_approved/pdf.
Anonymous: "GS1 EPCglobal's RFID-based EAS Strategic Overview", Sep. 1, 2009, Retrieved from the Internet: URL: http://www.gs1.org/sites/default/files/docs/epc/EAS_Strategic_Overview_v1.0_Approved/pdf.
Anonymous: "Electronic Article Surveillance—A Technology Comparison", Apr. 1, 2009, Retrieved from the Internet: URL: http://www.adt.ie/document-downloads/white-papers/EAS_Technology_Comparison_white_paper_ADT_NA.pdf.
Notification of Reason for Refusal (Korean Patent Application No. 10-2016-7010641) dated Jul. 9, 2019.

* cited by examiner

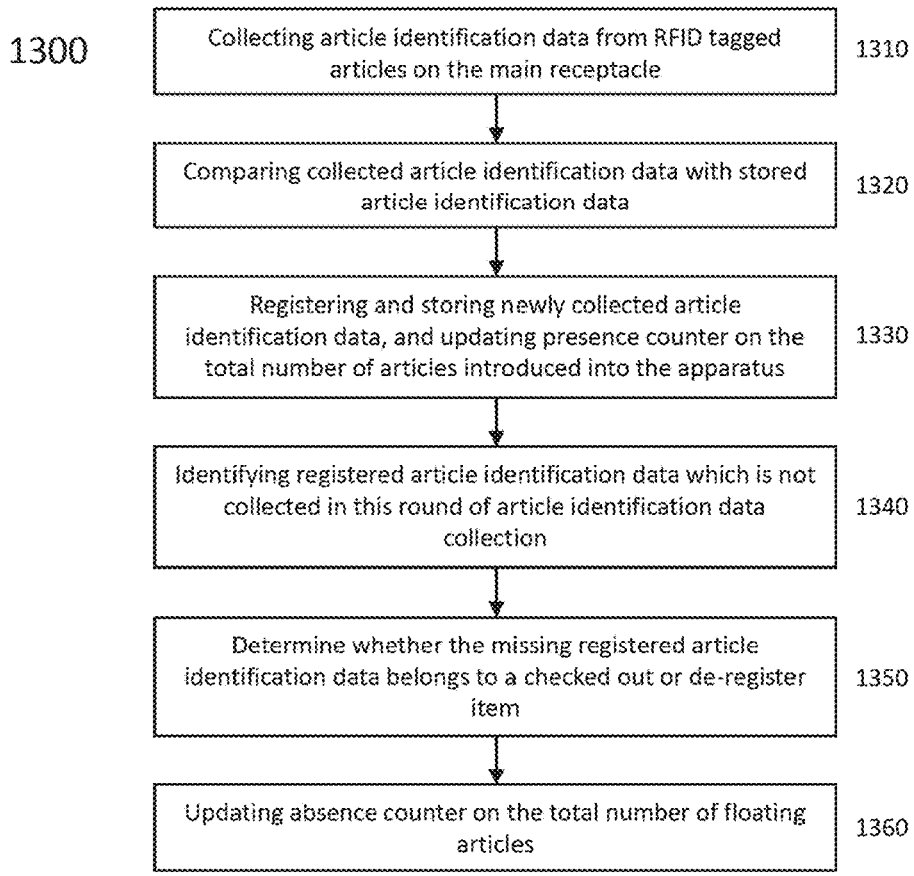
Fig. 6B
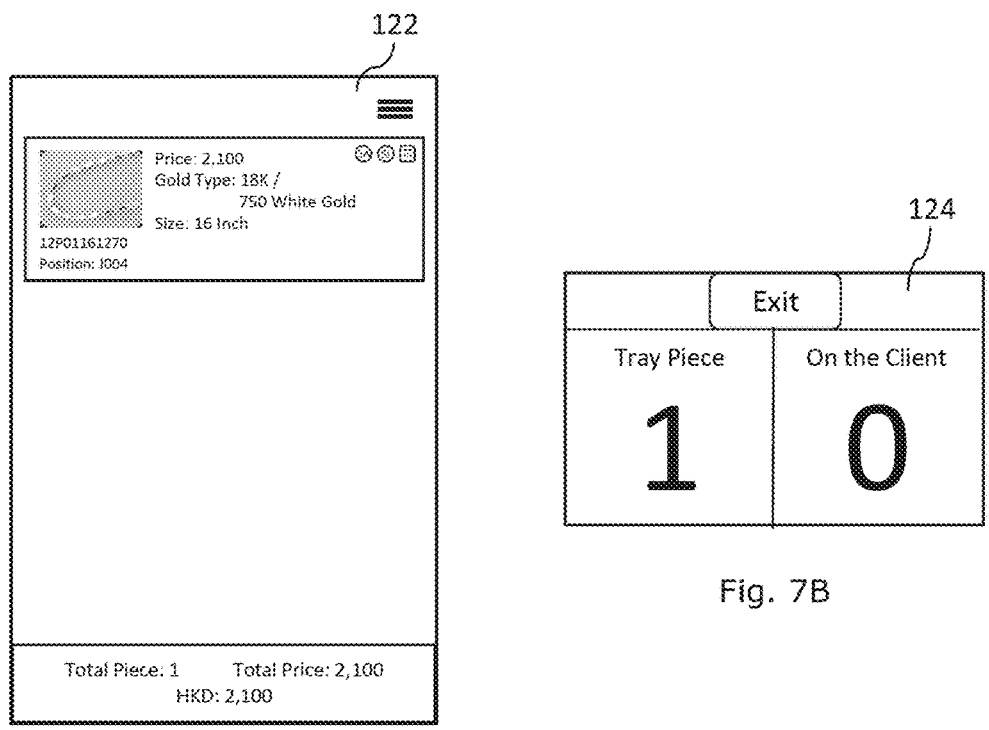
Fig. 7A
Fig. 7B

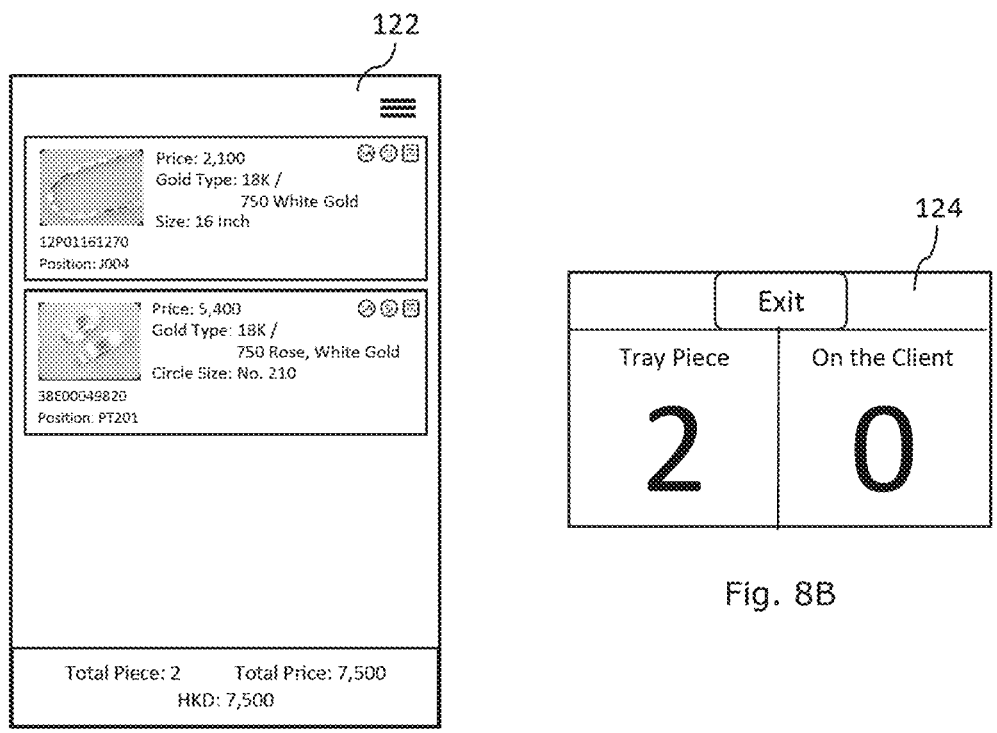
Fig. 8A
Fig. 8B
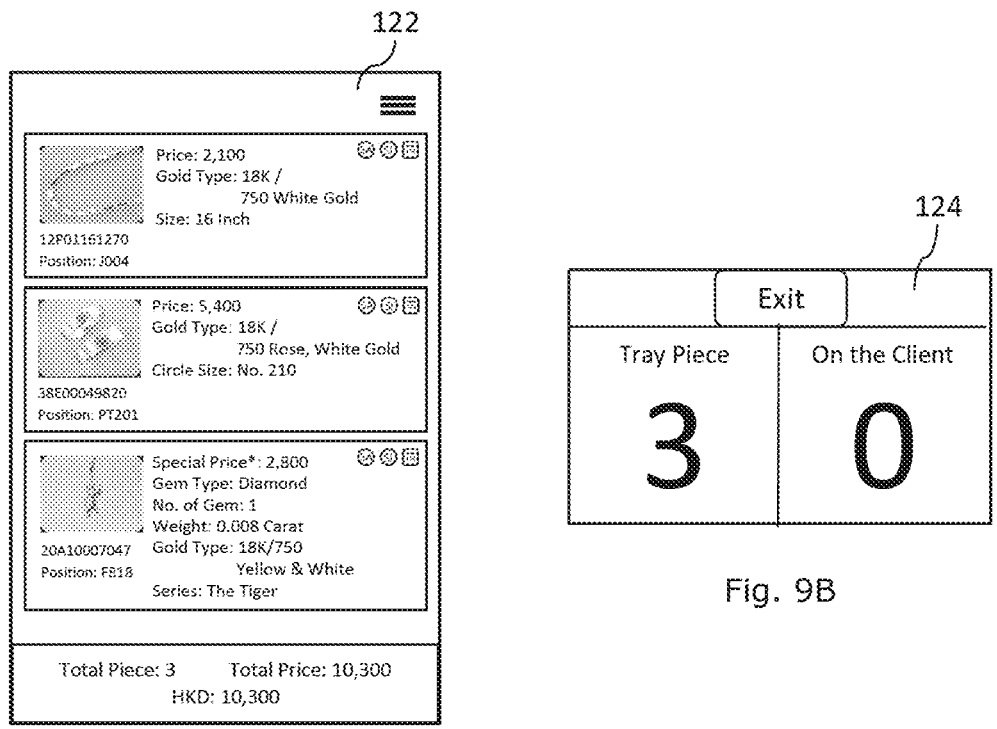
Fig. 9A
Fig. 9B

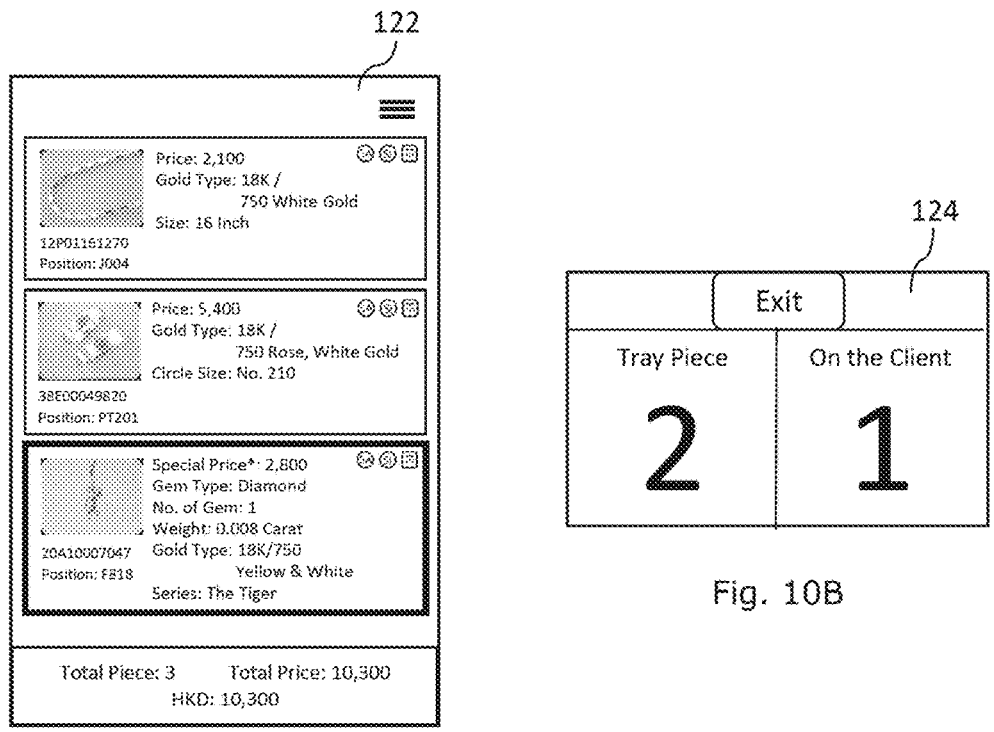
Fig. 10A
Fig. 10B
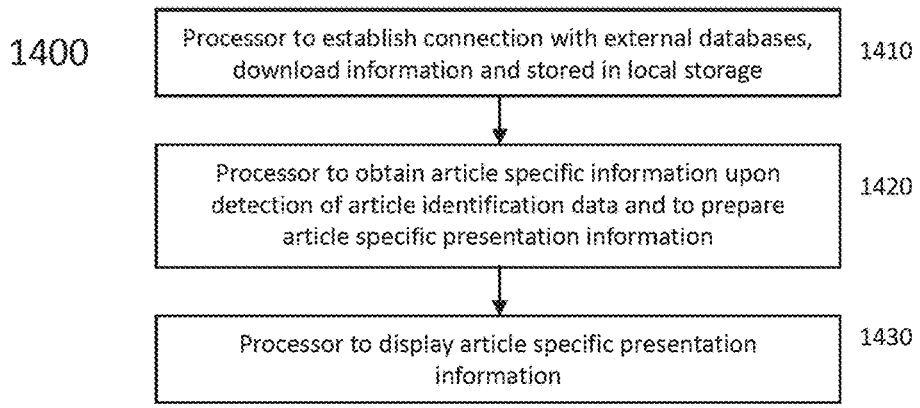
Fig. 11A
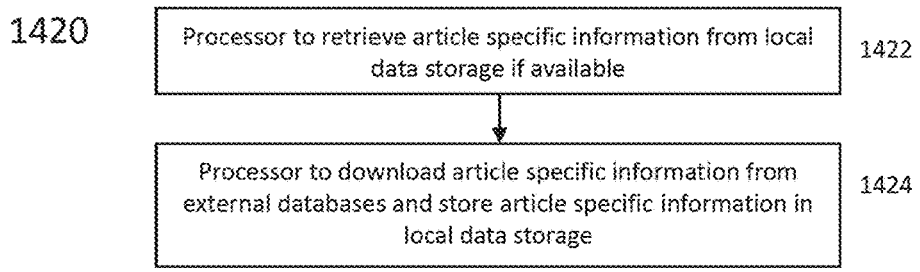
Fig. 11B

PRESENTATION APPARATUS (CHECK-IN AND CHECK-OUT)

FIELD

The present disclosure relates to apparatus for presentation, and more particularly, to presentation apparatus for presenting valuable or precious articles to customers or potential customers with an aim of facilitating purchasing transaction.

BACKGROUND

Many consumers enjoy shopping at 'real' or 'physical' shops so that they can feel, touch and closely examine real products as well as comparing products. In addition, many physical shops have shop attendants available to provide personal services such as real time product information, product comparison, advice and comparable products to assist a customer to make purchasing decisions.

During a shopping session, shop assistants often provide customers with many articles to compare with and to choose from. In many shopping occasions, several expensive and/or delicate items such as watches, jewellery, smart phones, or ornamental items may be placed on a presentation apparatus for customer viewing, examination and selection. Such presentation apparatus in retail business is commonly referred to as customer serving trays. A customer serving tray usually includes a main receptacle which allows open access by a viewer so that a viewer can access and remove articles on the tray for examination, close viewing or appreciation before making a purchase decision. Where the items are small and portable, tracking of article movements between a customer and a shop assistant can be difficult, especially when several items are placed on a customer serving tray to promote multiple purchase.

The value or preciousness, and therefore the price, of precious and/or valuable articles are often determined by properties and characteristics associated with the articles. Such properties and characteristics may be multifaceted, time variant and time invariant, and include, for example, design, shape, grading, uniqueness or rarity, material purity, weight or size, and/or price. It would be desirous if information on those properties and characteristics can be readily available at the time when presentation of an article is required.

DISCLOSURE

There is provided a customer serving apparatus equipped with RFID detectors to monitor and track movement of articles during a customer serving session. The customer serving apparatus, nicknamed "iTray" herein, is primarily a desktop apparatus, for example in the form of a portable tray, for use in retail services, especially in the retail of luxurious items such as jewellery, precious ornaments, pens and watches.

In this disclosure, there is disclosed an apparatus comprising a main receptacle, a first detector, a second detector and a processor; wherein said main receptacle is to hold articles for customer selection, said first detector is to detect presence of an article on said main receptacle, said second detector is to detect an article after said article has been removed from said main receptacle; and wherein the processor is to collect identification information of an article upon introduction of said article into the main receptacle during a serving session and to register introduction of said article, and wherein the processor is to check out or de-register said article from said serving session upon detection of presence of said article at said second detector.

DESCRIPTION OF FIGURES

The present disclosure will be described by way of example with reference to the accompanying Figures in which:

FIG. 6B is a flow diagram depicting example processor operation of the apparatus of FIG. 1, FIGS. 7A and 7B respectively show the first and second displays of the apparatus of FIG. 1 when in an operation state, FIGS. 8A and 8B respectively show the first and second displays of the apparatus of FIG. 1 when in another operation state, FIGS. 9A and 9B respectively show the first and second displays of the apparatus of FIG. 1 when in an operation state following that of FIGS. 8A and 8B, FIGS. 10A and 10B respectively show the first and second displays of the apparatus when one of the three articles on the main receptacle is checked out, FIG. 11A is a flow diagram depicting a flow of operations of the processor upon initialization and detection of article identification data, FIG. 11B is a flow diagram depicting a flow of operations of the processor to obtain article specific information,

DESCRIPTION

Figure 1:
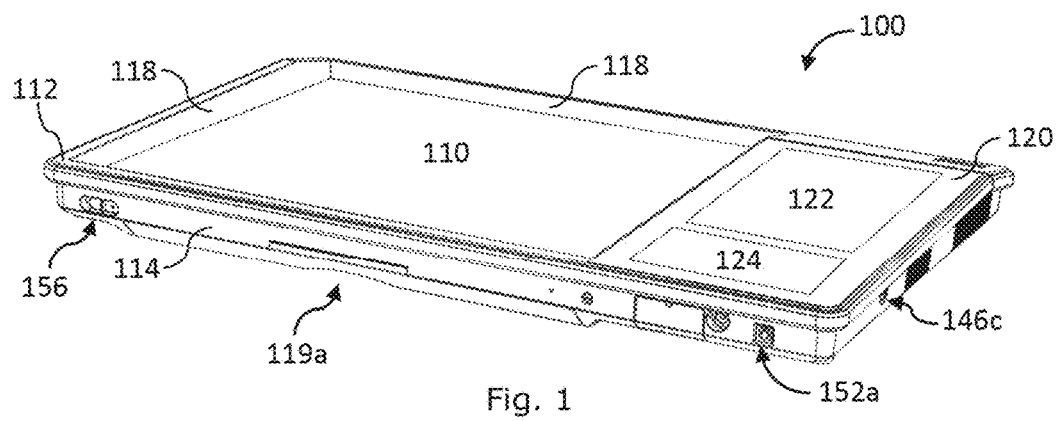
FIG. 1 is a first perspective view showing a presentation apparatus according to an example of the present disclosure.
Figure 1A:
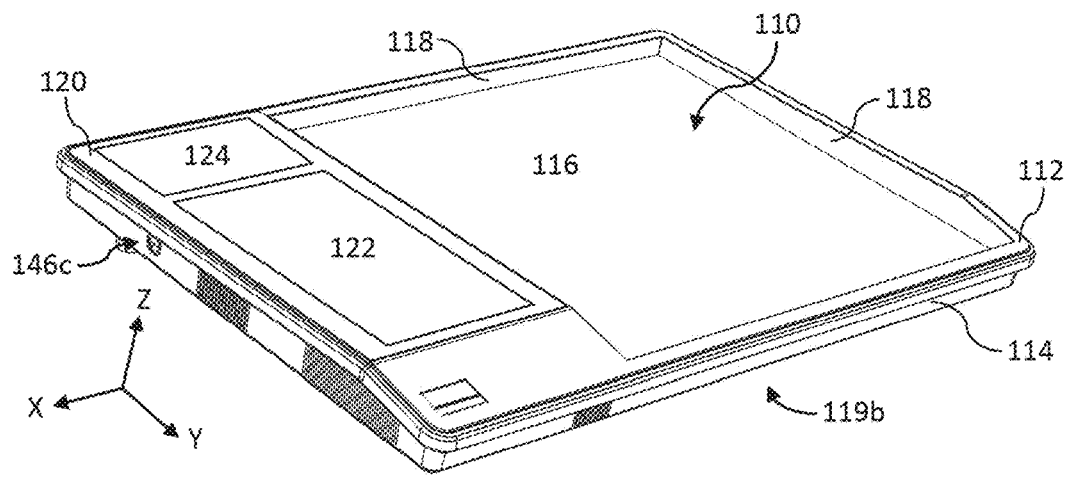
FIG. 1A is a second perspective view of the apparatus of FIG. 1.
Figure 1B:
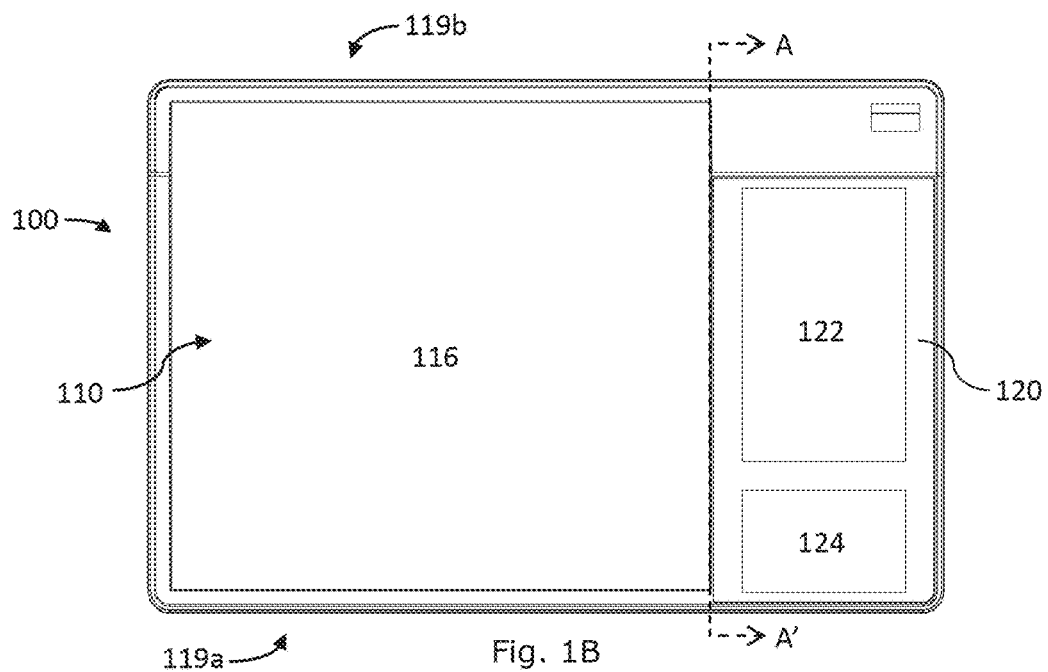
FIG. 1B is a top plan view of the apparatus of FIG. 1, FIGS. 1C and 1D are side elevation views showing lateral sides of the apparatus of FIG. 1.

A presentation apparatus 100 depicted in FIGS. 1 and 1A to 1F comprises a main receptacle 110 and a display region 120 comprising a first display 122 and a second display 124. The main receptacle 110 and the display region 120 are disposed on a main housing, with the display region on a lateral side of the apparatus adjacent the main receptacle 110. The main housing is made of hard plastics and comprises an upper housing 112 and a lower housing 114 which are in axial alignment and in mechanical engagement. The main housing defines a rigid structure and a hollow internal compartment to house operational electronics to facilitate operations of the apparatus 100. The main housing is a fastened assembly of the upper housing 112 and the lower housing 114.

The main receptacle 110 and the display region 120 are formed on the upper housing 112 with the main receptacle 110 on one lateral side of the upper housing 112 and the display region 120 on the other lateral side of the upper housing 112. The main receptacle 110 is formed as an indented portion on the top surface of the upper housing 112 and is in the form of a tray having a main surface 116 surrounded by a peripheral wall 118. The main surface of the tray defining the main receptacle 110 is at a depressed level below the top surface of the upper housing 112 and extends between an operator's end 119a and a viewer's end 119b of the apparatus. The peripheral wall 118 extends upwardly (Z-direction of FIG. 1A) from boundary of the main surface 116 to surround the main surface and to connect the main surface of the tray to the top surface of the upper housing. The main surface of the tray is open to external access and defines an open tray which is covered with a soft material such as velvet, silk, polyamide or other soft fabrics so that precious articles such as jewellery items can be placed on the tray for customer viewing, appreciation and examination. The tray is to facilitate a viewer to view and access articles on the main receptacle and to facilitate a viewer to remove an article for close examination or appreciation. To facilitate such open access and viewing, the tray is relatively shallow having a typical depth of between 1 cm and 3 cm.

When the apparatus 100 is placed on a levelled support surface during use, the main surface of the tray is parallel or substantially parallel to the support surface so that precious and/or valuable articles placed on the main receptacle will stay at the placing location unless intentionally moved by an operator or a customer. When in use, the apparatus is to be placed between an operator and a viewer so that the operator and the viewer are at opposite ends of the main receptacle with equal or substantially equal visibility and accessibility to articles on the tray.

The upper housing 112 includes an inclined portion which is on a lateral side of the apparatus and adjacent the main receptacle 110 to define the display region 120. The display region 120 is inclined towards the operator's end and is disposed such that the display region is to face the operator and to face away from a viewer during a viewing session when the operator is proximal the operator's end and the viewer proximal the view's end. As the display region is inclined to face the operator during use, the information shown on the display region will be readily readable by the operator but not so readily readable by the viewing customer unless with assistance of the operator or through deliberate movement of the viewing customer which will be noticeable by the operator or assistants in the vicinity.

The inclined display region is formed on the upper housing and extends between an elevated ridge and the operator's end. The elevated ridge is formed near the viewer's end and extends transversally from a lateral boundary of the main receptacle to a lateral edge of the upper housing. The display portion inclines gradually from the elevated ridge and stops at the operator's end. The inclination of the display region is designed to facilitate comfortable viewing of information by the operator while sufficient to hide information being displayed on the display portion from the viewer when sitting at the viewer's end. The upper housing includes another inclined portion which extends between the elevated ridge and the viewer's end. The two inclined portions are oppositely facing and cooperate to define a housing portion extending between the opposite ends of the upper housing and resembling a ridged roof as depicted in FIGS. 1C and 1D. The display region 120 is inclined relative to the main surface of the tray so that a viewer at the viewer's end can have a full view of the tray but not the display region, which is inclined to face away from the viewer's end. In use, the apparatus is intended to be positioned between an operator and a viewer, with the display region facing the operator and facing away from the viewer. A viewer is typically a customer or a potential customer but can be other people such as an interviewee, a valuator or a staff.

The display region comprises a first display 122 comprising a first LCD display and a second display 124 comprising a second LCD display. The first LCD display is mounted on a first window formed on the display region and the second LCD display is mounted on a second window between the first window and the operator's end.

To provide a sufficient useable area to hold precious articles for display and viewing, the main surface of the tray is to make up a substantial portion of the surface area of the upper housing while the display region will take up most of the remaining surface area of the upper housing so that sufficient information can be displayed during operations. In general, the main surface of the tray would make up around 65%-80% of the total projected area of the upper housing in the vertical direction while the display region will take up about 15-30% of that area. Of course, the proportion of the area of the main surface of the tray to the projected area of the apparatus or the proportion of the area of the display region to the projected area of the apparatus is variable and very much dependent on actual requirements or operation environment. In general, an inclination of the display region in the region of between 1.5° to 10° would be useful, while a lower inclination angle of say between 1.5° to 3°, or 2° to 5° would be less noticeable to a viewing customer.

Figure 1C:
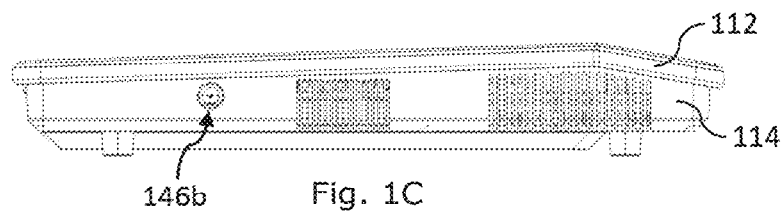
FIG. 1E is a cross-sectional view of the example apparatus of FIG. 1 taken along line A-A' of FIG. 1B.
FIG. 1F is a bottom plan view of the apparatus of FIG. 1.
Figure 1D:
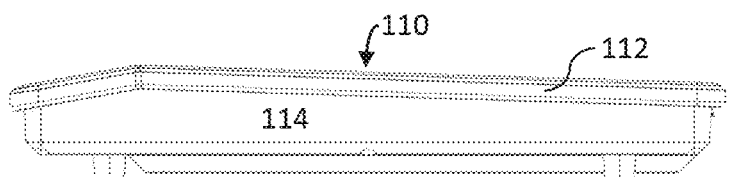
Figure 1E:
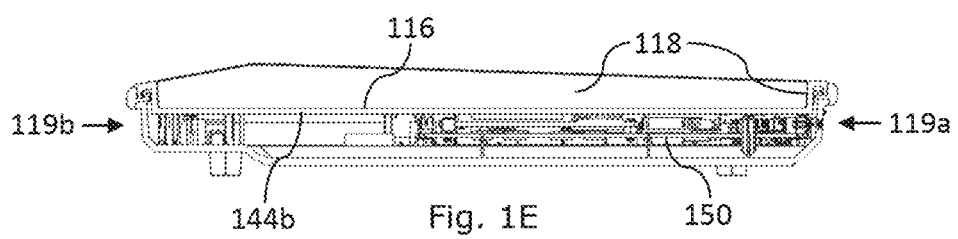
Figure 1F:
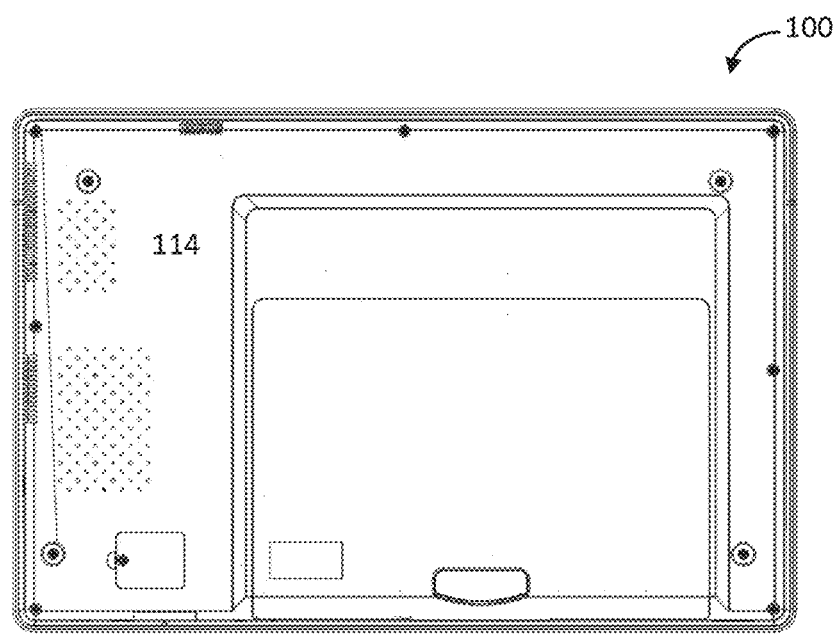

In a portable version of the example apparatus 100 as depicted in FIG. 1, the apparatus has the following example dimensions, in which the directions are indicated by arrows of FIG. 1:

|  | Width (mm) (x-direction) | Depth (mm) (y-direction) | Height (mm) (z-direction) | |
|---|---|---|---|---|
| Apparatus (100) | 440 | 293 | 24.95 | |
| Main receptacle (110) | 298 | 268 | 11.2 (min) | 18.1 (max) |
| Display region | 122 | 234 | | |
| First display (7" LCD) | 90 | 151 | | |
| second display (4" LCD) | 90 | 57 | | |
| Display region inclination | | | 1.85° | |

-continued

|  | Width (mm) (x-direction) | Depth (mm) (y-direction) | Height (mm) (z-direction) |
|---|---|---|---|
| Display region to apparatus area ratio % |  | 22% |  |
| Apparatus weight with battery (kg) |  | 2.5 |  |
| Apparatus weight without battery (kg) |  | 2.0 |  |

Figure 2:
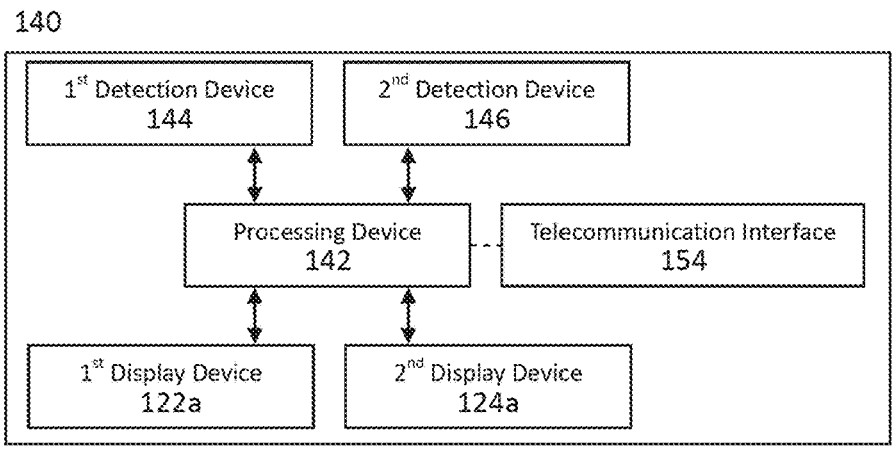
FIG. 2 is a schematic block diagram of example operation circuitry for use on the example apparatus of FIG. 1.

The example apparatus 100 includes example detection and display circuitry 140 depicted in FIG. 2. The detection and display circuitry 140 comprises a processing device 142, a first detection device 144, a second detection device 146, a first display device 122a and a second display device 124a. The first and second detection devices 144, 146 and the first and second display devices 122a, 124a are connected to the processing device 142 so that information collected through the first and second detection devices 144, 146 are output to the first and second display devices 122a, 124a for display after having processed by the processing device 142. The apparatus 100 may include a telecommunications interface 154 to facilitate data communication with external devices. The processing device 142 may include a single processor such as a single CPU (central processing unit), a plurality of processors each having individually designated duties or tasks, or a cluster of processors to facilitate distributed processing without loss of generality.

The detection and display circuitry 140 of this example apparatus is built around RFID (radio frequency identification) applications. In particular, the example detection and display circuitry 140 is built around the Class 1 Generation 2 RFID standard to operate in the UHF frequency range of 860 MHz to 960 MHZ. An RFID system built around this standard, also known as "EPC Gen 2" standard is attractive since the system is compatible with passive RFID tags of low per unit costs. Details of this standard, known as "UHF Air Interface Protocol Standard (Gen2)", is available at http://www.gs1.org/gsmp/kc/epcglobal/uhfc1g2/uhfc1g2_1_2_0-standard-20080511.pdf. RFID readers compatible with EPC Gen2 UHF RFID Reader standards are used for detection.

Figure 2A:
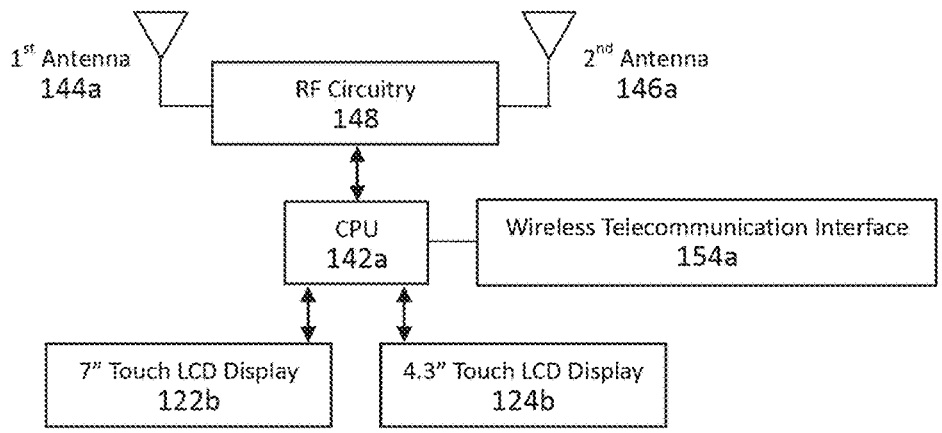
FIG. 2A is a schematic block diagram of example operation circuitry installed on the example apparatus of FIG. 1.

FIG. 2A is a block diagram showing an example embodiment of the detection and display circuitry 140 installed in the example apparatus 100. The example embodiment comprises a microprocessor as an example processing device 142 to operate as a central processing unit (CPU) 142a. A 7-inch touch screen-type LCD display 122b as an example of a first display device 122a is connected to the CPU 142a. A 4.3-inch LCD display 124b as an example of a second display device 124a is connected to the CPU 142a. The first and second detection devices 144, 146 are implemented in the form of a first antenna 144a and a second antenna 146a connected to a common radio-frequency circuitry 148. The radio-frequency circuitry 148 is connected to the CPU 142a. The first antenna 144a and the second antenna 146a are arranged to detect NFC (near field communication) RFID signals. The main beam width of the first antenna 144a is substantially wider than the main beam width of the second antenna 146a. A wireless telecommunication interface 154a to facilitate data communication with external devices is also connected to the CPU 142a.

Figure 2B:
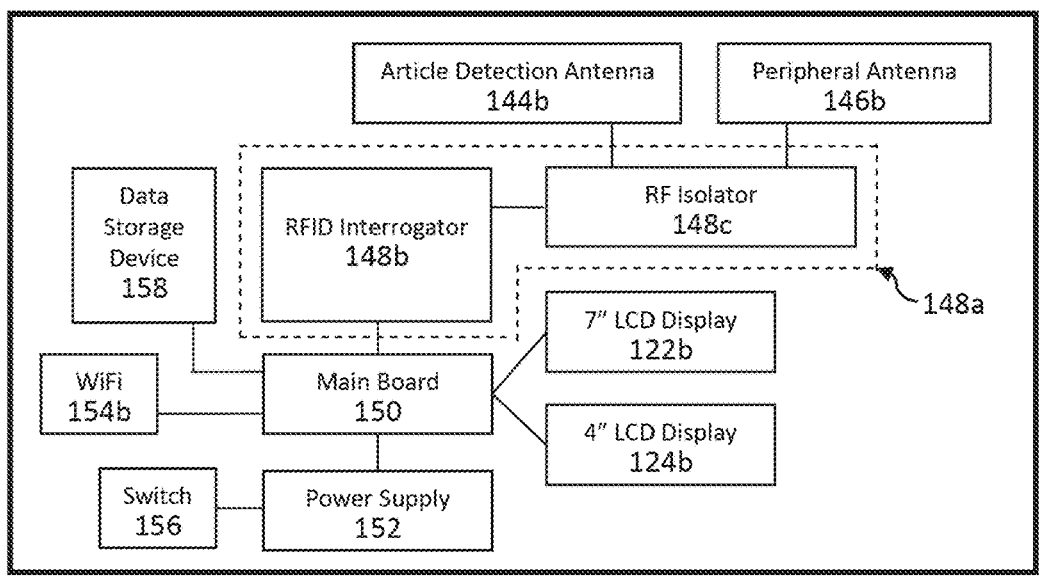
FIG. 2B is a schematic block diagram of the example circuitry of FIG. 2B in more detail.

The detection and display circuitry 140 of FIG. 2A is to operate as a backbone or infrastructure of the apparatus of the present disclosure. An example implementation of the detection and display circuitry 140 of FIG. 2A is depicted in FIG. 2B and most of the control and operational circuitry is housed inside the main housing and underneath the display region 150. The example detection and display circuitry 140 of FIG. 2B which is to form an operational backbone of the apparatus 100 of FIG. 1 comprises a main control board 150 on which the CPU 142a, data storage devices, data input device, data output device, data communication devices, peripheral devices and other operational electronics are mounted. A wireless data communication device in the form of a WiFi module 154b is also connected to the CPU 142a to facilitate data communication between the apparatus and a WLAN (wireless local area network) and/or external network or devices. The data storage devices 158 include solid state memories such as RAM, ROM, SD card and other devices such as a hard disk. The input/out devices include USB/micro USB or other data I/O ports. The 7-inch touch screen-type LCD display 122b includes finger sensors and operates as an input port. The peripheral devices include a battery indicator, a microphone, speakers, or alarms. The main control board 150 obtains operation power from a secondary battery 152 and a power switch 156 is provided on the operator end 119a to turn on or turn off power supply to the main control board 150. A DC power socket 152a is provided on the operator end 119a to supply power to the main control board when an external DC power supply is operational. The RF circuitry comprises an RFID module 148a. The RFID module comprises an RFID interrogator module 148b and an RF isolator module 148c. The RFID module 148ba is connected to the first antenna 144a which is to operate as an article detection antenna 144b and the second antenna 146a which is to operate as a peripheral antenna 146b. The RFID interrogator 148b is to transmit interrogation signals and to receive authentication replies from passive RFID tags and is available in module forms. A single RFID RFID interrogator 148b is shared by the first 144a and second 146a antennae to facilitate a more compact, lighter weight and less costly portable apparatus.

Figure 2C:
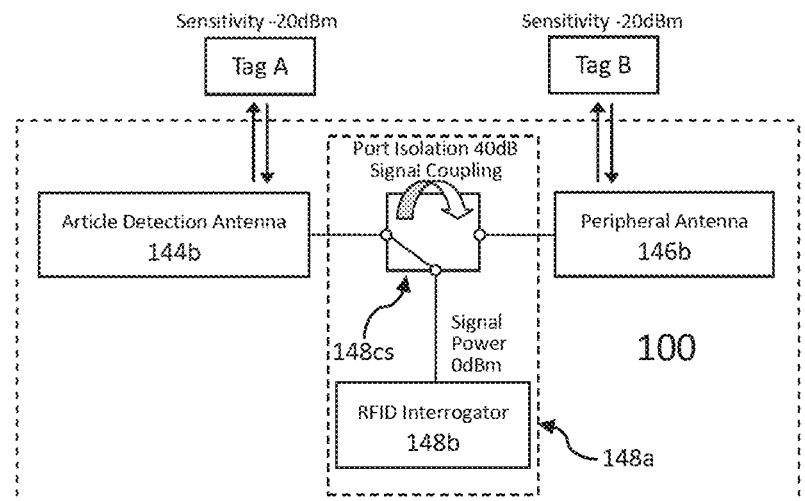
FIG. 2C is a schematic diagram depicting example arrangement and operation of the RFID module of FIG. 2B.
Figure 2D:
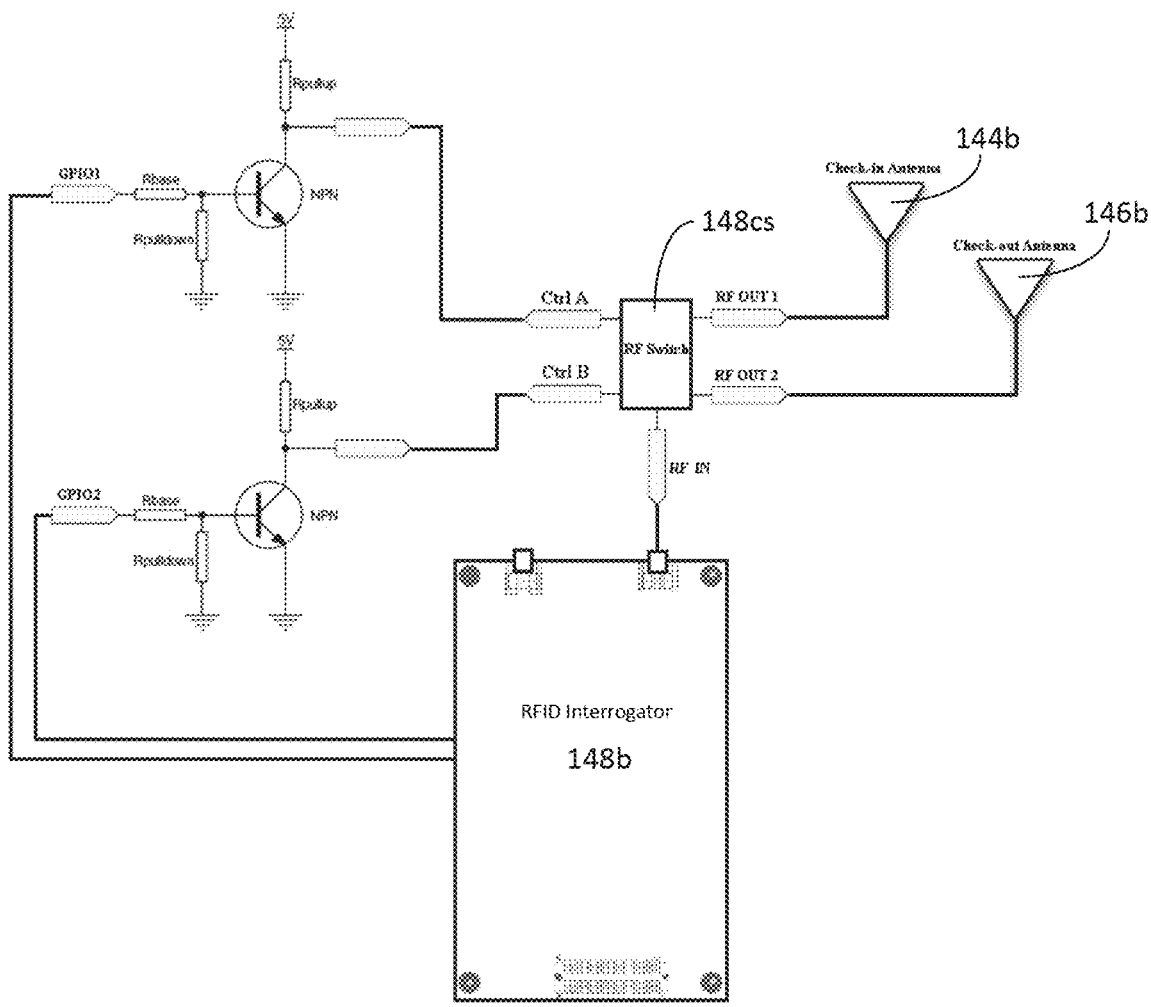
FIG. 2D is a schematic circuit diagram depicting example implementation of the RFID module of FIG. 2C.

As depicted in FIGS. 2C and 2D, the RF module comprises an RF interrogator 148b which is connected to an RF switch 148c to facilitate shared use of a single RF interrogator by the first antenna 144a which is to operate as the article detection antenna 144b and the second 146a antenna which is to operate as the peripheral antenna 146b. The RF switch 148c is to facilitate alternative formation of a first RF signal path and a second RF signal path with adequate RF isolation between the two RF signal paths. In this example, the first RF signal path is formed by RF connection between the RF interrogator 148b and the article detection antenna 144b and the second RF signal path is formed by RF connection between the RF interrogator 148b and the peripheral antenna 146b. The example RF switch 148c has isolation of about 40 dB between adjacent ports to provide the required RF isolation and to mitigate undesirable RF signal coupling between the two signal paths. In the example implementation as depicted in FIG. 2C, the RF signal power to be transmitted by the RF interrogator 148b for interrogation is set of 0 dBm. The detection sensitivity of each of the article detection antenna 144b and the peripheral antenna 146b is the same and is set to be −20 dBm.

Referring to FIG. 2D, the RF switch 148c comprises a first switching control port Ctrl A, a second switching control port Ctrl B, a first RF signal output port RF OUT 1, a second RF signal output port RF OUT 2, and an RF signal input port RF IN. The first and second switching control ports Ctrl A, Ctrl B are connected to corresponding control ports on the RF interrogator 148b to facilitate switching control of the RF switch 148c. The first RF signal output port RF OUT 1 is connected to the article detection antenna 144b to form the first RF signal path. The second RF signal output port RF OUT 2 is connected to the peripheral antenna 142*b* to form the second RF signal path. The RF signal input port RF IN is connected to an RF port of the RF interrogator 148*b* to form an RF signal path for transmission of interrogation signals to the antennae and receipt of response signals from the antennae 144*b*, 146*b*. The switching of the RF switch 148*c* is operated by control signals from the control ports of the RF interrogator 148*b* and the control signals are originated from the CPU 142*a*. The switching frequency or switching intervals of the RF switch 148*c* will determine the response time of the detection circuitry 140 and are typically set to meet a desirable response speed so that an operator can be made aware of status changes detectable at the antennae 144*b*, 146*b* within an anticipated time.

A typical switching frequency may be in the region of 1 Hz to 10 Hz so that RFID signals present at the antennae can be updated at intervals of between 0.1 second and a second. Where a quicker response time is required, the switching frequency may be set to be in the region of 10 Hz to 10 kHz so that the response time can be less than 100 millisecond (ms) and delay associated with the switched reading would not be human perceivable. In order to avoid confusing display of status information, the CPU may be set to only output such status information when the status has been stabilized, for example, no change in several seconds.

Figure 3A:
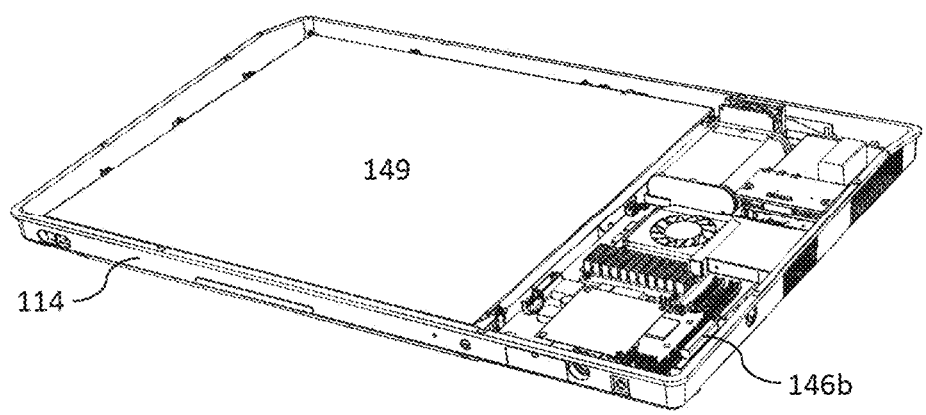
FIG. 3A is a top perspective view showing the apparatus of FIG. 1 after removal of the top panel and the article detection antenna.

The first antenna 144*a* is configured as an article detection antenna 144*b* to detect articles on the main receptacle. In order that articles on the main receptacle 110 and carrying RFID tags can be effectively detected, the article detection antenna 144*b* is required to have an effective detection range covering at least the entire main surface 116 of the tray on the main receptacle 110. An example antenna suitable for covering the entire main surface 116 is a distributed antenna such as the article detection antenna 144*b* depicted in the partially exploded view of FIG. 3A. This article detection antenna 144*b* is substantially planar and has planar detection elements that are distributed and/or spread in an area comparable to the area of the entire main surface 116. The article detection antenna 144*b* is placed immediately underneath the main receptacle 110 with the detection plane defined by the planar detection elements parallel or substantially parallel to the main surface 116. To promote maximal detection of signals coming from articles held in the main receptacle 110, the planar area of the article detection antenna 144*b* as defined by the planar extent of the entirety of the planar detection elements is comparable to that of the main surface 116 of the tray and is aligned therewith so that the planar extent of the planar detection elements of the article detection antenna 144*b* substantially overlaps or coincides with that of the main surface 116 of the tray.

The article detection antenna 144*b* is to detect radio frequency signals coming in from RFID tags on the tray or the main receptacle 110. Radio frequency signals not coming from the tray or from the main receptacle 110 are treated as spurious or unwanted signals and the reception thereof is to be mitigated. To provide radio frequency shielding against unwanted or spurious signals, the article detection antenna 144*b* is mounted on the top surface 149 of a metal casing with the planar detection elements sitting on the top surface 149 of the metal housing and exposed to and facing the bottom surface of the main receptacle 110.

Figure 3B:
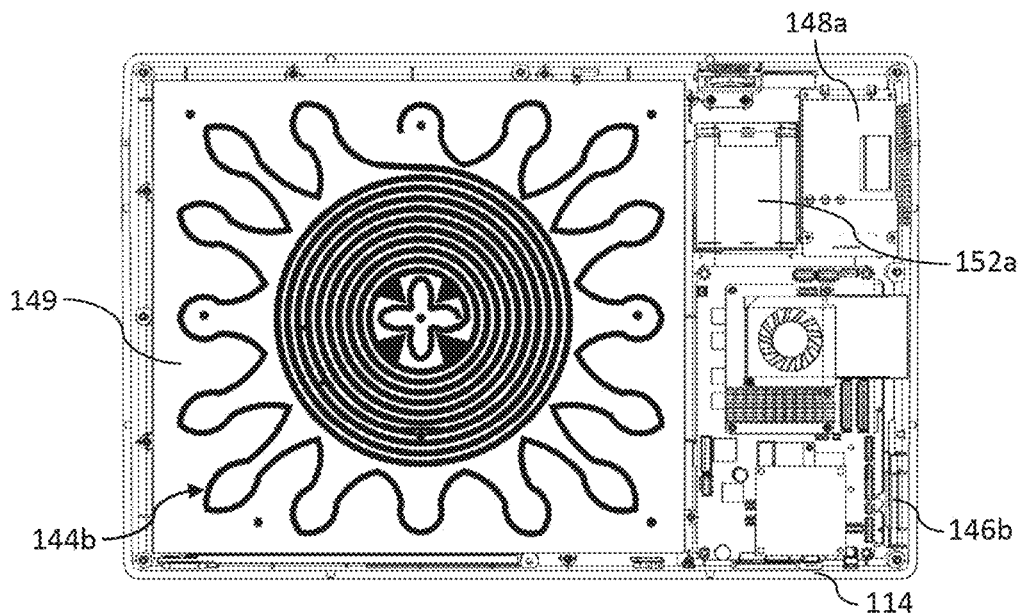
FIG. 3B is a top plan view showing the apparatus of FIG. 3A with the article detection antenna in place.
Figure 3C:
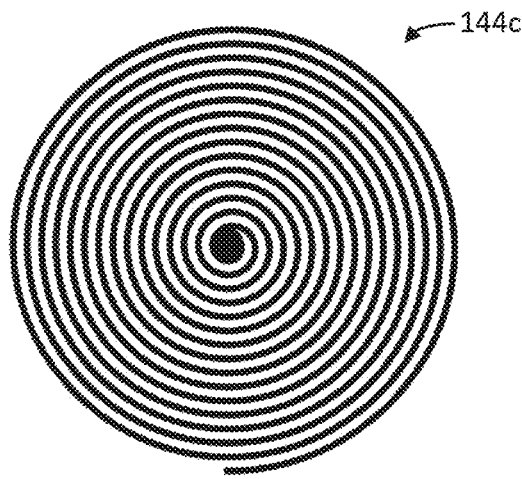
FIG. 3C is a schematic view depicting an example antenna element layout suitable for use as an alternative antenna.

The metal casing has a planar extent comparable, if not slightly larger, than that of main receptacle and has a top surface 149 parallel to the main surface 116 of the tray so that when the article detection antenna 144*b* is mounted on the top surface of the metal casing, the planar detection elements are parallel to the main surface 116 for maximal detection of radio signals coming from the main surface 116 and minimal detection of radio signals coming from other orientations. As an optional feature, the metal casing may include downwardly a depending wall or skirt extending around boundary of the top surface to enhance radio frequency shielding. An alternative antenna layout suitable to operate as an article detection antenna is depicted in FIG. 3C. While each of the antennas depicted in FIGS. 3B and 3C include planar detection elements which are arranged in a spiral form to enhance more effective detection coverage, the antenna may be in other forms, for example, may follow the shape of the main receptacle 110 so that the detection elements are parallel to the sides of main receptacle and parallel to other detection elements on the same side of the receptacle and gradually spiraled towards its centre. In general, the overall shape and extent of the article detection antenna 144*b* will be comparable to the overall shape and extent of the 110 to facilitate more effective detection coverage. Another re-chargeable battery, for example, a tablet-shaped battery having a larger energy capacity than the battery 152*a*, is mounted on the lower housing and below the metal casing to provide operation power as part of the power supply 152.

The second antenna 146*a* is configured as a peripheral antenna 146*b* to detect radio frequency signals coming from outside of the apparatus 100 but not from RFID tags attached to articles on the main receptacle 110. The second antenna 146*a* is mounted near a corner on the operator's end 119*a* of the apparatus which is distal from the main receptacle 110. The mounting of the second antenna 146*a* at a location distal from the main receptacle 110 and hence the article detection antenna 144*b* is to mitigate detection of radio signals coming from the main receptacle. This peripheral antenna 146*b* has planar detection elements which are arranged to define a detection plane that is orthogonal or substantially orthogonal to the detection plane of the article detection antenna 144*b*. This peripheral antenna 146*b* is oriented to detect radio signals coming from outside of the apparatus and in a direction (−X) towards the lateral side of the apparatus distal from the main receptacle 110. The second antenna 146*a* is for detecting radio frequency signals coming in from a localised source such as an access card or a single RFID tag and therefore has a physical and detection area substantially less than that of the article detection antenna 144*b*. In an example, the second antenna 146*a* is formed on a printed circuit board and is inserted vertically into a vertical slot formed on the lower housing 114 so that its detection surface is outwardly (X-direction of FIG. 1A) facing. Radio frequency signal shielding is provided on the backside of the second antenna 146*a* to mitigate receipt of unwanted or spurious radio frequency signals coming from the backside of the second antenna 146*a*. The backside of the second antenna 146*a* is the side facing the main receptacle 110 and the unwanted or spurious radio frequency signals would include residual RFID signals coming towards the second antenna 146*a* after traversing the radio frequency shielding on the article detection antenna 144*b*.

While the article detection antenna 144*b* and the second antenna 146*a* are both formed as a printed circuit board (PCB) antenna with the detection elements imprinted on a substrate of a PCB, each or one of the antennae can be formed on other substrates or mediums and in a membrane form or a template form without loss of generality.

Figure 4A:
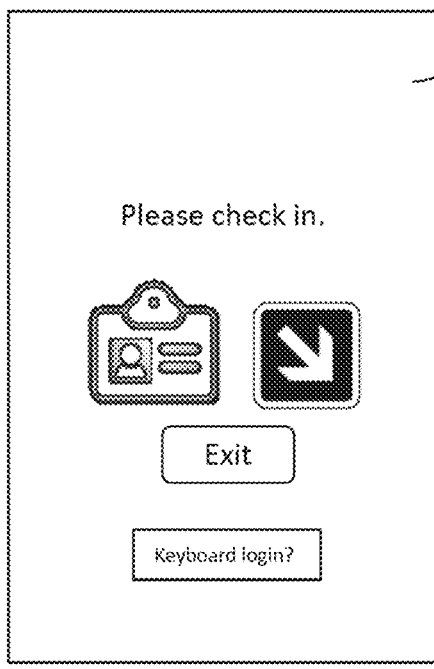
FIGS. 4A and 4B are schematic diagrams depicting information displayed on the first display and the second display when the apparatus is in stand-by mode awaiting access request and authorization.
Figure 4B:
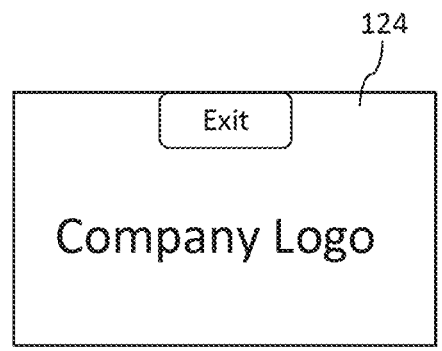

To use the apparatus 100, an operator will turn on the power switch 156 and the processor will execute initialization instructions to initialise. After completion of initialization procedures, the detection and display circuitry 140 will be activated and the apparatus 100 will be ready to operate upon validation of the access authorization of an operator by the processor 142a. Upon completion of the initialization process, an access invitation message such as an image showing how to access or 'check in' will be displayed on the second, larger, display 122 as depicted in FIG. 4A. A company logo or other non-sensitive information may be displayed on the first, smaller, display 124 as depicted in FIG. 4B. At this time, the detection and display circuitry 140 will be operational and the RF interrogator 148b will repeatedly transmit interrogation signals to the second antenna 146b to detect request for access. The interrogation signals may be sent at a higher repetition frequency, for example, 100 interrogations per second, to ensure a prompt response to a request to access. At this stage, the RF interrogator 148b does not need to send interrogation signals to the first antenna and the RF switch 148c may be maintained at a position corresponding to one that maintains constant connection of the second RF signal path to the RF interrogator 148b but not the first signal path.

To gain authorized access to operate the apparatus 100, an operator will present an RFID enabled access card to an access authorization detector on the apparatus 100. In this example, the second antenna 146a is configured as an access authorization detector and the portion of the main housing facing the detection surface of the second antenna 146a is grille-shaped to define a detection window 146c. An intended operator will present the RFID enabled access card to the detection window 146c which is on one lateral side of the apparatus 100 proximal the display region and the operator's end 119a. When the RFID information contained in the access card and detected by the apparatus 100 through operation of the RF interrogator 148b is verified by the CPU 142a as consistent with valid access authorization, the apparatus will enter into actual operation modes. As an additional feature or an alternative, an intended operator may access the apparatus 100 by entering an authorization code through an interactive input window on the touch screen 122 depicted in FIG. 4A.

Figure 5A:
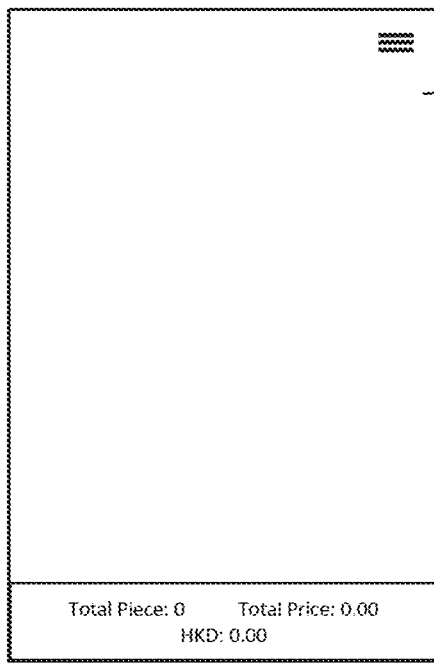
FIGS. 5A and 5B are schematic diagrams depicting information displayed on the first display and the second display when the apparatus is in an initial operational state.
Figure 5B:
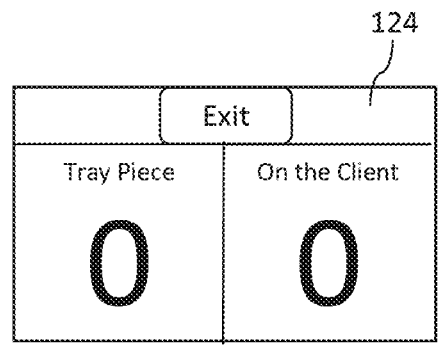

After access to the apparatus 100 has been validated, the apparatus 100 will enter into an operation mode upon execution of prescribed instructions. Initially, no article is on the main receptacle and nullity information corresponding to a condition of zeroes or 'no article has been introduced' will be displayed on the first 122 and second 124 displays as depicted in FIGS. 5A & 5B. When the apparatus 100 is in operation, the RF interrogator 148b will in response to instructions of the processor repeatedly send interrogation signals to the article detection antenna 144b to detect and monitor status of articles which carry RFID tags and are on the main receptacle 110. In addition, the RF interrogator 148b will in response to instructions of the processor 142 repeatedly send interrogation signals to the second antenna 146b to detect and monitor conditions corresponding to conditions requiring attention or special treatment. As there may be a plurality of articles carrying RFID tags on the receptacle at the same time, and movement of such articles in and out of the man receptacle 110 may be expected to more frequently occur than conditions that can be expected to be detectable at the second antenna 146b, the time used by the RF interrogator 148b to serve the article detection antenna 144b will be substantially higher than that used to serve the second antenna 146b where a single RF interrogator 148b is shared between the two antennae so that interrogation signals need to be sent alternatively to the antennae.

Figure 6:
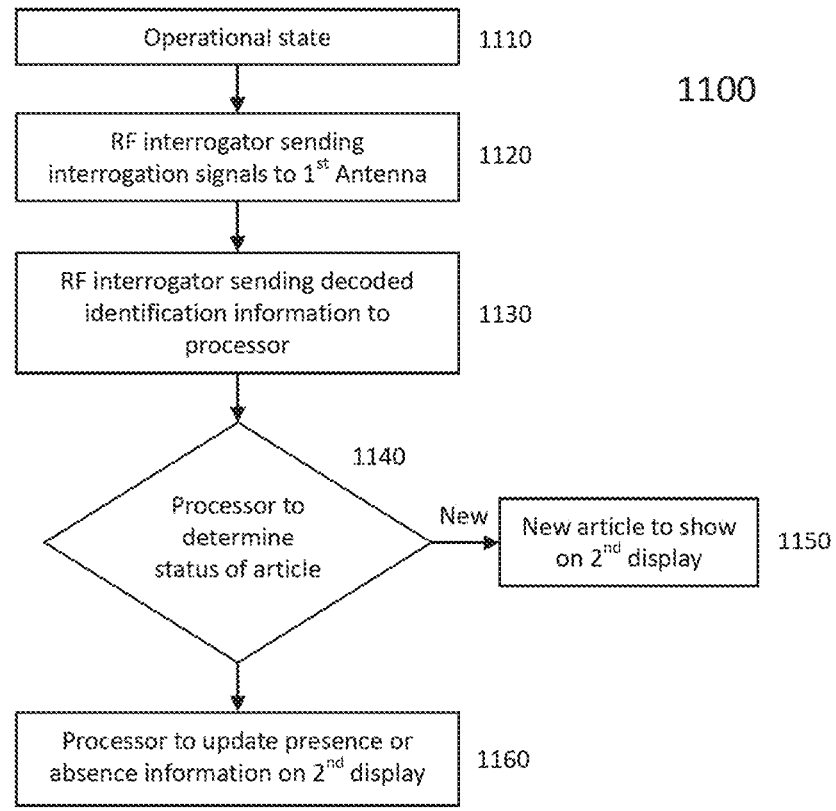
FIG. 6 is a flow diagram depicting example operation of the apparatus of FIG. 1.

Example operation of the apparatus 100 will be described with reference to the flow diagram 1100 of FIG. 6. After the apparatus 100 has entered into operational mode at 1110, the RF interrogator 148b will send encoded interrogation signals to the article detection antenna 144b, as depicted in 1120. When radio signals received at the RF interrogator 148b are from the article detection antenna 144b and correspond to RFID signals, the RF interrogator 148b will forward decoded RFID information containing article identification information to the processor 142 at 1130. Upon receipt of the article identification information, the processor 142 will determine whether the article identification information received include that of a new article or an existing article at 1140. If the received article identification information includes that of a new article or a plurality of new articles, the processor will generate information relating to the new article or articles and display the relevant article information on the first display at 1150. If the received article identification information corresponds to article identification information of existing articles, the processor will determine whether an existing article which was present during the last update has become missing and whether any existing article which was absent during the last update has become present again and to provide presence and absence information on the first display 124 at 1160. An article is described as a 'new article' herein if the article is introduced into the main receptacle 110 for the first time during the current presentation session or viewing session. An article is described as an 'existent article' herein if the article has been introduced into the main receptacle 110 during the current presentation session or viewing session. An article is described as a 'floating article' herein if the article has been introduced into the main receptacle 110 but has been temporarily moved out of the main receptacle 110 and has not be returned to stock or 'checked out'.

In order to assist an operator to track movement of RFID tagged articles after introduction into the apparatus during a customer serving session, the processor 142 is to maintain a first counter and a second counter. The first counter ("presence counter") is to track the number of RFID tagged articles which are present on the main receptacle. The second counter ("absence or floating counter") is to track the number of RFID tagged articles which are moved out of the main receptacle after introduction into the main receptacle and before returning to the shop's stock. The instantaneous value of the first counter is to be displayed in a first sub-window on the second display 124 and the instantaneous value of the second counter is to be displayed in the second sub-window to provide visual assistance to the operator.

As shown in FIG. 5B, the second display 124 includes a first sub-window to provide the number of articles which has been introduced into the main receptacle and a second sub-window to provide the number of articles which are floating articles. A floating article is presumed to be with a current viewer and the number of floating articles is displayed under the heading "on the client" in the second sub-window. In this example, the first sub-window of the second display 124 is for indicating the number of articles that is present on the main receptacle and the second region of the second display is for indicating the number of articles that is moved out of the main receptacle 110 after introduction into the main receptacle but not yet checked out. In processing terms, the first sub-window is to display the instantaneous numerical value of a first counter corresponding to a presence counter and the second sub-window is to display the instantaneous numerical value of a second counter corresponding to an absence counter, In operation terms, the first sub-window of the second display 124 is for indicating the number of articles that is present on the main receptacle and the second region of the second display is for indicating the number of articles that is moved out of the main receptacle 110 after introduction into the main receptacle but not yet checked out.

Figure 6A:
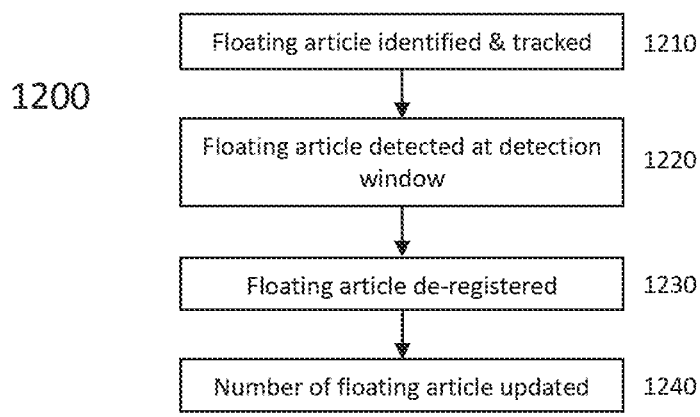
FIG. 6A is a flow diagram depicting example operation of the apparatus of FIG. 1.

Referring to the flow diagram 1200 of FIG. 6A, an article will be treated as a floating article at 1210 when the article is removed from the main receptacle 110 after introduction. Where a floating existent article is to be returned to the stock, the operator will present that article to the detection window 146c and the floating article will be deregistered from the list of existent or introduced articles at 1220. After de-registration, the number of floating articles will be updated at 1230. The de-registration process is also referred to as a 'checking out' process herein. As the article identification antenna 144b operates to detect introduction of an article into the main receptacle, the article identification antenna 144b is also described as a 'check-in antenna' herein. Where the second antenna 146b is to operate to de-register an article from the list of 'existent articles', the second antenna 146b will also be referred to as a 'check-out antenna' and the detection window 146c will then serves as a check-out port. Of course, the second antenna 146b has other functions as described herein such as to facilitate access request detection.

In some modes of operation, the apparatus 100 is to operate to monitor and track articles introduced into the main receptacle and their subsequent status.

Referring to the flow diagram 1300 of FIG. 6B, the processor 142 in such modes of operation is to operate the first detection device 144 to detect and collect article identification data from RFID tagged articles on the main receptacle 110 after initialization has completed as depicted in 1310. Upon collection of article identification data from the main receptacle 110, the processor is to compare the collected article identification data with article identification data stored in the local data storage as depicted in 1320. The identification data stored in the local data storage are article identification data collected during the last round of data collection and has included information on number of articles present on the main receptacle and number of floating articles and their respective identification date. If the collected article identification data include new article identification data of an article which was not previously collected and registered in a current viewing session, that new article identification data will be treated by the processor as corresponding to an article which is newly introduced into the main receptacle. Upon detection of the presence of a new article on the main receptacle, the processor will at 1330 register the new article as an "introduced item", to store the article identification data of the newly introduced article, and update a presence counter to keep track on the total number of articles introduced into the apparatus during a session. The processor will determine (with reference to the stored article identification data) whether any registered article identification data is not present (or is absent or missing) in this latest round of article identification data collection at 1340, and to determine whether the missing article identification data corresponds to that of a checked-out or de-registered item at 1350. If the missing article identification data corresponds to that of a checked out item, the number of floating articles will be reduced compared to last number. If the missing article identification data does not correspond a checked out item, the number of floating articles will be increased compared to last number. At 1360 the processor will update an absence counter to keep track on the total number of instantaneous floating articles in the current viewing session.

Example operations during an example viewing session will be explained with reference to FIGS. 7A to 10B.

After completion of the initialization process, an article having an associated RFID tag (an "RFID tagged article") is introduced into the main receptacle by an operator and placed on the velvet floor of the main receptacle 110. When the check-in antenna has detected the RFID signals emitted by the RFID tag associated with the newly introduced article, the processor 142a will search through its accessible databases and retrieve product related information associated with that specific RFID. In this example, EPC code is used as an example of unique identification code for retrieving information relating to an RFID tagged article. The accessible databases may include databases stored on the apparatus or accessible via telecommunications means such as the WiFi frontend or LAN connection. Selected product related information will be displayed on the first display as depicted in FIG. 7A. The processor will increment the presence counter by 1 and the number "1" is displayed on the first sub window of the second display as depicted in FIG. 7B as there is one RFID tagged article introduced into and present on the main receptacle 110. At this time, there is no floating article, and the number "0" is displayed on the second display portion of the second display to indicate that there is no floating article. In this example, the first RFID tagged article that is introduced into the apparatus 100 is a gold ring.

Next, a second RFID tagged article is introduced into the main receptacle 100 by the operator. With the introduction or "checking-in" of the second RFID tagged article, there is now a total of two RFID tagged articles introduced into and present on the apparatus. Upon detection of the second RFID tagged article by the check-in antenna 144b and the processor selected information relating to the newly introduced article will be presented in the first display as depicted in FIG. 8A. The processor will increment the presence counter by 1 and update the first display region of the second display so that the number "2" is displayed to indicate that a total of two RFID tagged articles is present on the main receptacle 110, and the number "0" is displayed on the second display portion of the second display to indicate that there is no floating article, as depicted in FIG. 8B. In this example, the second RFID tagged article that is introduced into the apparatus 100 is a gold pendant.

A third RFID tagged article is introduced into the main receptacle by the operator. With the introduction of the second RFID tagged article, there is now a total of three RFID tagged articles introduced into and present on the apparatus 100. Upon detection of the presence of the third RFID tagged article by the check-in antenna 116 and the processor, the processor will update the first display region of the second display so that the number "3" is displayed to indicate that a total of three RFID tagged articles is present on the main receptacle 110, and the number "0" is displayed on the second display portion of the second display to indicate that there is no floating article, as depicted in FIG. 9A. Selected product related information of all the three RFID tagged articles is also retrieved from the product database and displayed on the first display by the processor as depicted in FIG. 9B. In this example, the first RFID tagged article that is introduced into the apparatus 100 is a diamond ring.

One of the three RFID tagged articles is then moved out of the main receptacle 110 for customer viewing and that moved article will be out of the detection range of the check-in antenna 144*b*. When the presence tracking assembly comprising the check-in antenna 144*b* and the processor 142 can no longer detect the presence of that article on the main receptacle 110, the assembly will take the non-detection as an indication that the article has been moved out of the main receptacle. At this time, the process will decrement the presence counter by "1" and increment the absence (or floating) counter by "1" to reflect the removal as depicted in FIGS. 10A and 10B. As an optional feature, part of the product related information relating to the floating article, for example, the product ID or appearance may have a different visual representation to that of the articles present on the main receptacle so that the operator can have the immediate knowledge of which specific article is or articles are floating. The difference in visual representation may be by way of different colour schemes, flashing, highlight, or other forms without loss of generality.

When the floating article is returned to the main receptacle 110, the presence tracking assembly will update the information and the states of the display will return to that of FIGS. 9A and 9B.

On the other hand, if the operator decides to return the floating article to the shop's stock or inventory control, the operator will place the RFID tagged article against the check-out port 146*c*. When the RFID tagged article is placed in proximity of and against the check-out port 146*c*, it is within the detection range of a check-out assembly comprising the check-out antenna 146*b* and the processor 142. When the processor 142 has detected presence of the RFID tagged article at the check-out port, the processor will register that RFID tagged article as a "checked-out" article. Once an article has been checked out and registered as a checked-out article, the apparatus will no longer track its movement or whereabouts unless the article is re-introduced onto the main receptacle. When the article has been checked out, the processor 142 will update its counter, including the presence counter and the absence counter, to reflect the discharge of an article from scrutiny measures provided by the apparatus.

When a viewing session has come to an end, an operator can according to the information on the apparatus complete a purchase transaction.

In this example, the floating article is the last article introduced into the main receptacle which is depicted in FIG. 9A. Upon checking out of this last article, the first display is updated so that the product information relating to this first article is no longer shown. In addition, the presence counter and the absence counter are also updated to reflect that the first article has been checked out. Specifically, each of the presence and absence counters is decrement by 1 to reflect the check out or discharge. At this point, the information displayed on the first and second displays are restored to that of FIGS. 8A and 8B.

It will be noted that when the RFID tag at the check-out port 136*c* is out of the detection range of the check-in antenna 144*b* due to the distance of separation as well as the RF shielding, the presence of the RFID tag at the check-out port will not be detected by the check-in antenna, even though the physical separation between the check-out port and the check-in antenna is in the region of 10-15 cm only. The separation between the first antenna 144*a* and the second antenna 146*a* exceeds the detection range of the second antenna 146*a*.

The RFID tag used in this example is formed on one side of a foldable label carrying selected product related information such as product ID, serial number, price, quality, or other relevant description or information. An RFID antenna is integrally formed on the other side of the foldable label and an RFID circuit is bonded to the antenna. A miniaturised and foldable RFID tag is useful for article of a small size and high value, such as jewellery items of the present examples. The RFID tags are folded into one third of the unfolded size.

After the customer sessions has ended, the operator will check out all the articles remaining on the main receptacle individually or simply authorize bulk check out of all items by activating a bulk check out function. In the example apparatus, the display region 120 and the detection window 146*c* are both located on the right side of the apparatus 100 to suit a right-handed user. The display region 120 and the detection window 146*c* may alternatively be located on the left side of the apparatus 100 to suit a left handed user. In some embodiments, the display region 120 and the detection window 146*c* may be located on the middle of the apparatus 100 so that the main receptacle 100 comprises trays on both sides of the display region 120, and with the detection window 146*c* on the operator's end.

At the end of the customer serving session, the identification of articles which have been introduced into the main receptacle and/or the identification of articles which have been moved out of the main receptacle for customer examination will be logged for subsequent or future use. To distinguish between the removal of an article form the main receptacle for customer viewing and that for straight check out, a threshold floating time, say 10-20 seconds, may be used to differentiate the two types of action. For example, where the floating time exceeds 10 seconds, the floating time will be interpreted as corresponding to customer viewing, rather than straight check-out.

To further utilise the logged information, the apparatus includes an interactive process to collect information regarding the customer of that customer serving session for future use. The process may include the steps of the operator entering information relating to personal particulars, events that trigger the purchase or the shopping exercise, purpose of the purchase or the shopping exercise, geographic origin of the customer, language used by the customer, or other information which may be used for service and/or business enhancement. In some modes of operation, the apparatus 100 is to cooperate with external databases. For example, the apparatus 100 may cooperate with external databases to obtain and prepare presentation information for a viewer. In general, presentation information to be presented to a viewer during a viewing session typically comprises "article specific information" which is information specific to an article and "general information" which is information relating but not specific to an article. Article specific information typically includes selected information relating to shape, appearance, style, quality, colour, grade, purity, weight, total number of articles in production, number of articles in stock, pricing formulae, latest auction or bid prices and/or certification number of the article. Article specific information may optionally include promotion information on a particular article such as extra discount, rebates, etc. General information is typically non-article specific information and typically includes selected general information such as information relating to merchandise price such as price of precious metals including gold, silver, platinum, etc.; price of precious stones including diamond, sapphire, emerald, jade, etc.; currency exchange rates; promotional discounts to a class of customers such as loyalty member scheme or credit card schemes.

Referring to the flow diagram 1400 of FIG. 11A, the processor 142 upon completion of initialization of the apparatus 100 will establish data connection with external databases via the telecommunications interface 154 and download information which may be used in subsequent viewing sessions at 1410. The information to be downloaded may include time-variant information such as merchandise price information, currency exchange rates, and current or special promotional schemes. In addition, the information to be downloaded may include article specific information. Such article specific information may be on items which have been identified as popular or hit items. The article specific information may contain time invariant or non-time sensitive information such as article identification number, information on shape, appearance, size, style, quality, content, colour, grade, purity, weight, and/or certification number of the article; and/or time variant information such as the total number of articles in production, total number sold, number in stock, identification of shops having stock, pricing formulae, special sale terms, etc. The downloaded information is stored in local data storage devices 158 for subsequent use.

When an actual viewing session begins, the processor 142 will upon detection of a newly introduced article prepare presentation information specific to that article for display at 1420. The article specific presentation information to be displayed is primarily article specific information comprising time invariant information and time variant information. For example, the time invariant information being displayed on FIG. 9A includes gold content, weight, shape and appearance, size, position, and article identification data of the articles, while the offer prices are example of time variant information. Where the article specific information is available locally, the processor will retrieve the relevant information from the local data storage. Otherwise, the processor will request the article specific information from the external database by sending the associated article identification data to the external databases. The price information is computed according to a formula which is specific to the article with reference to time variant merchandise price information. After the price has been calculated, article specific presentation information will be displayed on the first display 122 at 1430, with individual price set out adjacent a graphic representation of the article and total price set out at the bottom of the first display 122 as depicted in FIGS. 7A, 8A, 9A and 10A.

Referring to the flow diagram of FIG. 11B, the processor will search for article specific information in the local data storage at 1422 to facilitate preparation of presentation information. If the article specific information in not available in the local data storage, the processor will contact external databases to download the article specific information at 1424. When an article is removed from the main receptacle during an active viewing session, whether for viewing or for checking out, the processor 142 will upon detection of a status of absence of the article from the main receptacle classify the article as a "floating article" and generates visual indicia on the first display 122 to inform the operator of such as status until the article is subsequently checked out or returned to the receptacle.

During the course of a viewing session, the processor 142 will operate to log and store the viewing history in the local data storage. The information to be logged to form a viewing history includes the identification data of the articles introduced into the main receptacle, the identification of articles removed for viewing, the number of viewings per article, the total viewing duration of a viewed article, and/or the article purchased. The viewing history will be uploaded to external data storage for subsequent processing and use for information compilation.

While the present disclosure has been illustrated with reference to the above example, it should be appreciated that the examples are for illustration only and shall not be used to restrict scope of the disclosure. For example, while various standards and protocols have been used herein for convenience, it should be understood that the present disclosure is not limited to such standards and/or protocols. Furthermore, where an apparatus comprising a processor is described, it should be appreciated that the processor can be a single processor, multiple processors, a cluster of processors, or distributed processors without loss of generality. Where a method or process is described herein, it should be appreciated that the method or process can be implemented by means of hardware, software, firmware or a combination thereof without loss of generality.

| Table of numerals | | | |
|---|---|---|---|
| Apparatus | 100 | Display region | 120 |
| Main receptacle | 110 | First display | 122 |
| Upper housing | 112 | First display device | 122a |
| Lower housing | 114 | 7-inch touch screen LCD display | 122b |
| Main surface of tray | 116 | Second display | 124 |
| Peripheral of tray | 118 | Second display device | 124a |
| operator's end | 119a | 4-inch LCD display | 124b |
| viewer's end | 119b | Main control board | 150 |
| detection and display circuitry | 140 | Power supply | 152 |
| processing device | 142 | Secondary battery | 152a |
| CPU | 142a | WiFi | 154 |
| first detection device | 144 | Power switch | 156 |
| first antenna | 144a | Local data storage | 158 |
| Article detection antenna | 144b | RF circuitry | 148 |
| second detection device | 146 | RFID module | 148a |
| second antenna | 146a | RFID interrogator | 148b |
| peripheral detection device | 146b | RF Switch | 148c |
| detection window | 146c | Top surface of metal casing | 149 |

The invention claimed is:

1. An apparatus comprising:
a main receptacle configured to hold articles for customer selection;
a first detector configured to detect presence of an article on said main receptacle, wherein said first detector comprises a first wireless sensor arranged to detect RFID (radio frequency identification) signals;
a second detector configured to detect an article after said article has been removed from said main receptacle, wherein said second detector comprises a second wireless sensor arranged to detect RFID (radio frequency identification) signals; and
a processor configured to:
collect identification information of an article upon introduction of said article into the main receptacle during a serving sessions;
register introduction of said article; and
check out or de-register said article from said serving session upon detection of presence of said article at said second detector,
wherein said first wireless sensor comprises a first antenna which is distributed underneath the main receptacle and the second wireless sensor comprises a second antenna which is disposed on a side of a rigid housing which defines said main receptacle, wherein the side of said rigid housing on which said second antenna is mounted is distal from said main receptacle, and wherein separation between said first antenna and said second antenna exceeds a predetermined detection range of said second antenna.

2. An apparatus according to claim 1, wherein the processor is to continuously track presence and absence of an article from said main receptacle through said first detector after said article has been checked in or registered until said article is checked out or de-registered through said second detector.

3. An apparatus according to claim 1, wherein said first antenna and said second antenna are arranged to detect NFC (near field communication) RFID signals.

4. An apparatus according to claim 1, wherein detection range of said first antenna is set to cover the entire main receptacle and the detection range of the second antenna is set to be in a direction away from said main receptacle.

5. An apparatus according to claim 1, wherein the main beam or main detection directions of said first antenna and said second antenna are at least at 45° apart.

6. An apparatus according to claim 1, wherein the main beam or main detection direction of said second antenna is parallel or substantial parallel to an article holding surface of said main receptacle.

7. An apparatus according to claim 1, wherein the apparatus comprises a display device, and the display device is connected to the processor for displaying information processed by the processor in relation to articles introduced onto said main receptacle and to movement of articles during a serving session, and wherein the display device is disposed between said first and said second antennae.

8. An apparatus according to claim 1, wherein the apparatus comprises a first display portion and the processor is configured to cause display of product information relating to an article on said main receptacle on said first display portion, said product information comprising one or more of the following: product identification, product appearance, weight, unit price, available discount.

9. An apparatus according to claim 8, wherein the apparatus comprises a second display portion to display number of articles on said main receptacle.

10. An apparatus according to claim 9, wherein the apparatus comprises a third display portion to display number of articles removed from said main receptacle and not checked-out.

11. An apparatus according to claim 1, wherein the processor is configured to repeatedly scan the main receptacle to determine identification of articles on the main receptacle and articles removed from the main receptacle and to display information on the number of articles removed from the main receptacle until an article is checked out.

12. An apparatus according to claim 1, wherein a removable tray is placed on top of said receptacle, and the tray is for carrying jewelry or ornamental articles for displaying to customers for selection.

13. An apparatus according to claim 1, wherein the apparatus is of desktop type or portable type.

14. An apparatus comprising:
a main receptacle configured to hold articles for customer selection,
a first detector configured to detect presence of an article on said main receptacle, wherein said first detector comprises a first wireless sensor arranged to detect RFID (radio frequency identification) signals;

a second detector configured to detect an article after said article has been removed from said main receptacle, wherein said second detector comprises a second wireless sensor arranged to detect RFID (radio frequency identification) signals; and
a processor configured to:
collect identification information of an article upon introduction of said article into the main receptacle during a serving session;
register introduction of said article; and
check out or de-register said article from said serving session upon detection of presence of said article at said second detector,
wherein said first wireless sensor comprises a first antenna which is distributed underneath the main receptacle,
wherein the second wireless sensor comprises a second antenna which is disposed on a side of a rigid housing which defines said main receptacle,
wherein the side of said rigid housing on which said second antenna is mounted is distal from said main receptacle, and
wherein the main beam width of said first antenna is substantially wider than that of said second antenna.

15. An apparatus according to claim 14, wherein both said first and said second detectors are configured to detect RFID signals emitted from an RFID tag associated with an article.

16. An apparatus according to claim 14, wherein the processor is configured to register an article as a checked-in item upon introduction of the article into the main receptacle during a serving session and to continuously track presence and absence of said article from said main receptacle until said article is de-registered or checked out.

17. An apparatus according to claim 16, wherein the processor is configured to update an article as being checked out of the serving apparatus when the article is placed proximally against said second wireless sensor.

18. An apparatus comprising:
a main receptacle configured to hold articles for customer selection,
a first detector configured to detect presence of an article on said main receptacle, wherein said first detector comprises a first wireless sensor arranged to detect RFID (radio frequency identification) signals;
a second detector configured to detect an article after said article has been removed from said main receptacle, wherein said second detector comprises a second wireless sensor arranged to detect RFID (radio frequency identification) signals and a checkout port; and
a processor configured to:
collect identification information of an article upon introduction of said article into the main receptacle during a serving sessions;
register introduction of said article; and
check out or de-register said article from said serving session upon detection of presence of said article at said second detector,
wherein said first wireless sensor comprises a first antenna which is distributed underneath the main receptacle,
wherein the second wireless sensor comprises a second antenna which is disposed on a side of a rigid housing which defines said main receptacle,
wherein the side of said rigid housing on which said second antenna is mounted is distal from said main receptacle,
wherein the first antenna is radio frequency shielded to detect RFID signals coming in from the main receptacle, and wherein the first antenna is radio frequency shielded to prevent or mitigate detection of RFID signals coming in from the second antenna or the checkout port.

19. An apparatus according to claim 18, wherein the second antenna is configured to detect RFID signals of an RFID tagged article presented at the checkout port, wherein the second antenna is radio frequency shielded to prevent or mitigate detection of RFID signals coming from the main receptacle, and wherein the second antenna has an outward-facing detection surface which is opposite-facing the checkout port and which is facing away from the main receptacle.

20. An apparatus according to claim 18, wherein the second antenna has a main beam width which defines a detection direction, and the detection direction is a direction which is away from said main receptacle, and wherein the second antenna has a beam width which is substantially narrower than the beam width of the first antenna.

21. An apparatus according to claim 18, wherein the main beam directions or the main detection directions of said first antenna and said second antenna are at least 45° apart.

* * * * *